Patented June 20, 1939

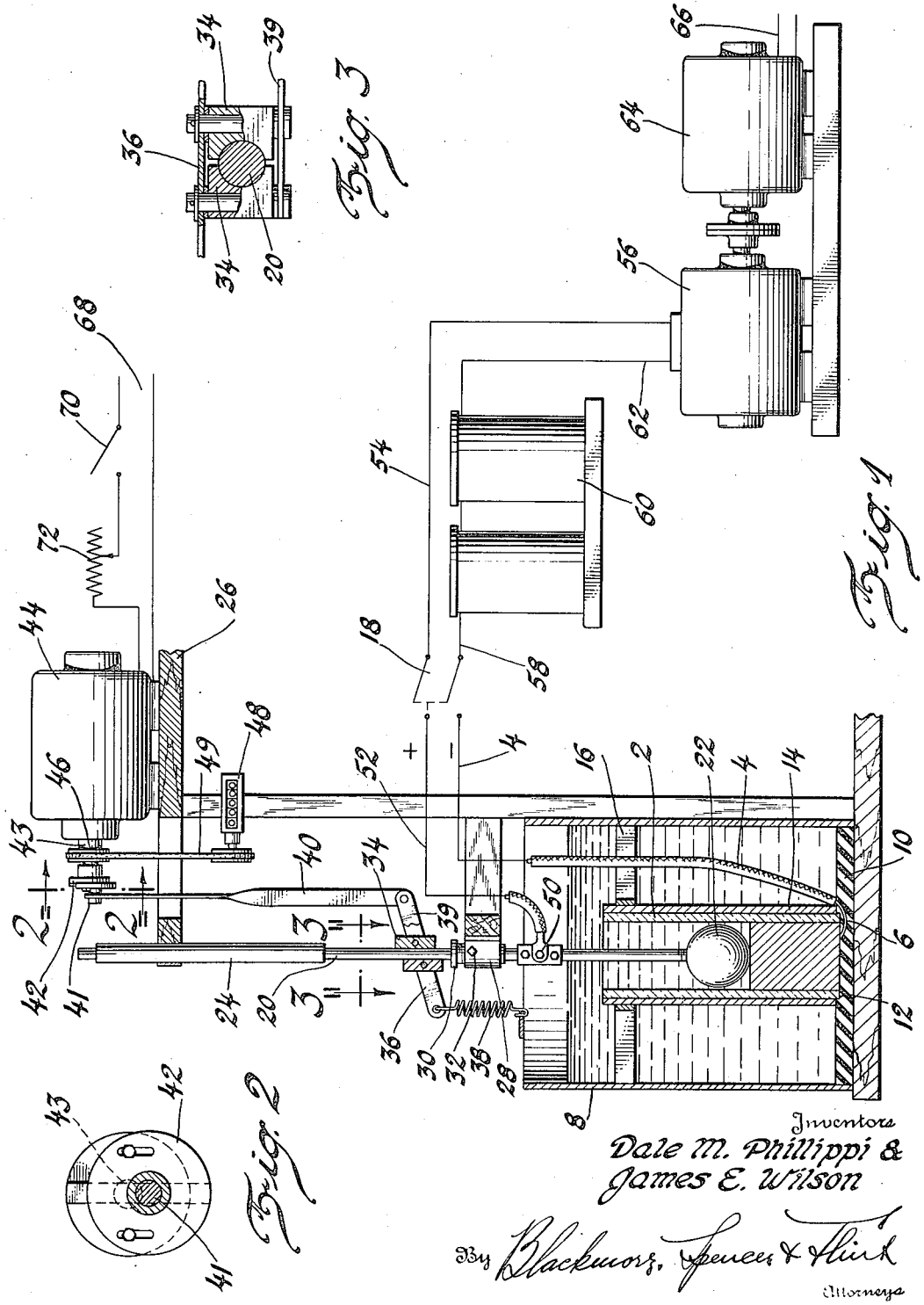

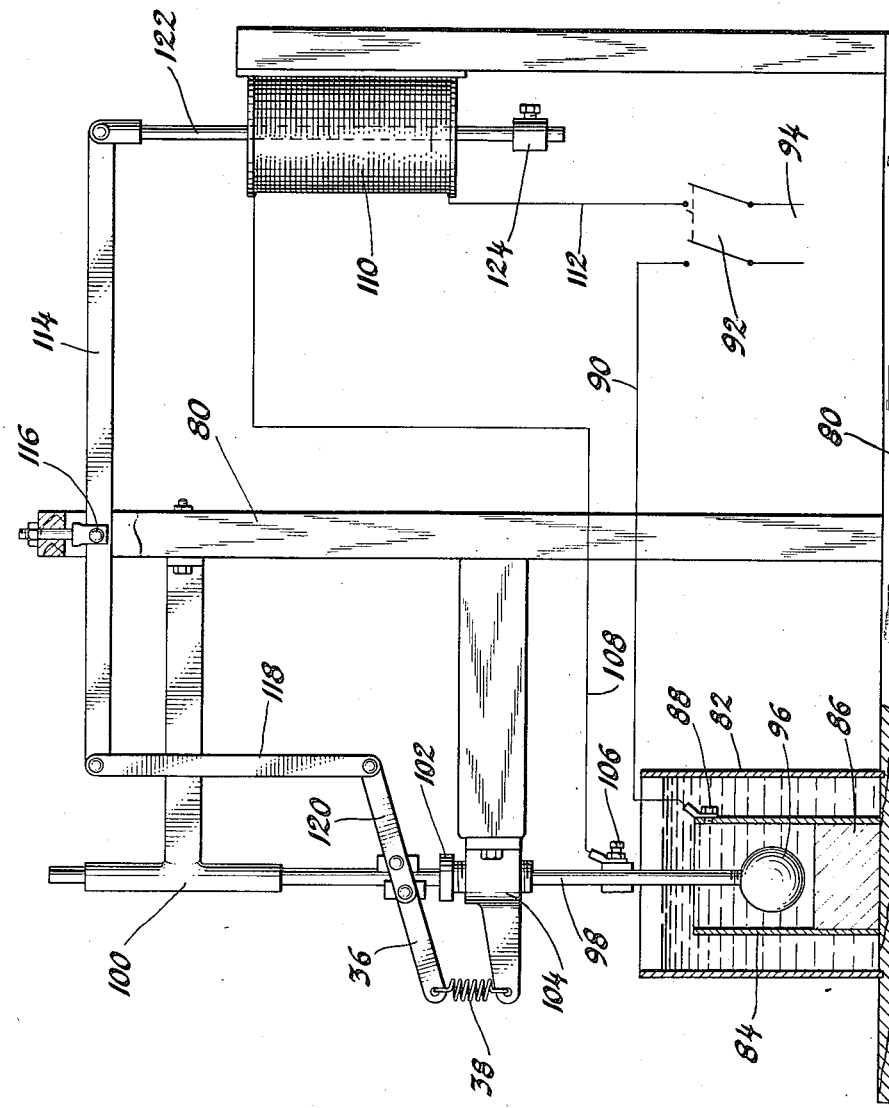

2,162,823

UNITED STATES PATENT OFFICE 2,162,823

APPARATUS FOR PRODUCING COLLOIDAL SUSPENSIONS OF METALS

Dale M. Phillippi and James E. Wilson, Dayton, Ohio, assignors to General Motors Corporation, Detroit, Mich., a corporation of Delaware Original application August 16, 1935, Serial No. 36,509. Divided and this application October 8, 1936, Serial No. 104,588

9 Claims. (Cl. 204—31)

This invention relates to the reduction of metals to a very finely divided condition, some portions of which are of colloidal dimensions, and is a division of application Serial No. 36,509, filed August 16, 1935. It particularly relates to an apparatus for producing colloidal suspensions of lead, lead alloys, or other metals and alloys, in water or other liquid media. This is an improvement in the field of electrical dispersion of substances (pioneered by Bredig and others). The suspensions produced by the apparatus are of such concentration as to allow their adaptation to commercial processes on a practical basis.

In the manufacture of such articles as clutch facings and brake linings, the present composition is a combination of asbestos fibers and metal binder, the metal binder being in very finely divided condition when applied to the fibers and being thereafter reassembled by heat and pressure, as set forth in the application of H. D. Geyer et al., Serial No. 5,576, filed February 8, 1935, and of which this application is a continuation in part. It is for these and analogous purposes that the colloidal or semi-colloidal lead is used.

It is therefore an object of our invention to provide means for breaking down a substance such as metal into a very finely divided or colloidal state.

It is a further object to accomplish this breakdown out of contact with air and so prevent or limit oxidation. It is moreover essential and convenient to collect and retain the broken-down material in a medium favorable to its subsequent utilization in the processing of some product.

With the above and other objects in view which will be more evident as the specification progresses, the embodiments of our invention will be better understood by reference to the following specification and drawings, in which, Figure 1 shows a schematic diagram of a mechanical means and electrical connections for carrying out the invention.

Figure 2 is a sectional view on the line 2—2 of Figure 1.

Figure 3 is a sectional view on the line 3—3 of Figure 1.

Figure 4 is a diagram similar to Figure 1 showing a modified form of our invention.

In operating we use commercially pure metal to which may be added, if desired, agents to slow up the oxidation, change form of crystalline structure of metal, lower the melting point, or give any special properties to the metal or metallic suspension which may be desired. In the production of our lead suspensions we have added approximately ½ of 1% of bismuth to the lead electrodes with an apparent advantage of slowing up the oxidation action. We have also gained other desired characteristics of the finished friction material and in other cases the lead suspension itself by the addition of small amounts of tin, tellurium, arsenic, antimony, etc.

It has been found that the crystalline structure of the electrodes as controlled by the alloying ingredients, the rate of cooling from the molten state, the pouring temperature, subsequent heat treatment, and any other factors that influence the structure of the metals have a decided effect on the characteristics of the suspension and the relative efficiency of the apparatus as a dispersion means. The lead is melted and poured into a hollow non-conducting ceramic tube such as that shown at 2 in the accompanying drawings. It has been found by experience that for lead (containing small amounts of bismuth), the casting is in a more satisfactory condition for the break-down if the mass is allowed to stand in a molten condition for as much as 6 hours and then cooled slowly in air. It should be noted that the level of the top of the casting is less than half way up the ceramic tube and the reason for the tube extending above will be brought forth clearly as the specification progresses. In casting, one end of a power lead 4 is cast into the base, as shown at 6.

The tube 2 is then set in a large cylindrical vessel 8, the bottom of which is covered by a hard rubber sheet 10, the central part of the sheet being countersunk as at 12 to accommodate the lower end of the ceramic tube. The outer surface of the tube is surrounded by a metallic jacket 14 which is clamped thereon to prevent breakage and a triangular spreader 16 is secured to the top of the assembly and extends to the inside wall of the vessel at spaced points to prevent the tube from tipping over. The metal, lead in this case, therefore acts as the lower electrode and is connected by the lead 4 to one side of a double pole switch 18. The vessel is then filled with distilled water up to the level shown by the dotted line and totally submerges the tube.

Suspended on one end of a vertical steel shaft 20 is a spherical ball 22 which acts as the upper electrode, this particular shape being merely illustrative as a flat circular disk may be used or other forms. The upper portion of the steel rod 20 is supported in vertical position by a long, cylindrical sleeve 24 supported on any suitable supporting platform such as 26. The central portion of the rod is supported by the bearing means 28 which is composed of an outer shell, the inner surface of which is threaded and into which screws a bushing 30. A set screw 32 is threaded through the outer surface of the casing and abuts the bushing 30 to hold it in any desired position. The purpose of the adjustable bushing, through which the rod slides, is to act as a clutch trip, which will be more clearly set forth at a later point. Just above this trip is a two-piece spring loaded clutch having two faces 34 bearing against each opposite side of the rod, these two halves being supported on a cross rod 36 which is spring biased by spring 38 which extends between one end of the cross bar and the frame. The opposite end of the cross rod 36 is pivotally connected to a long vertical bar 40 and a parallel link 39 is connected between the opposite sides of the clutch members 34 and the bar 40. The opposite end of the bar 40 is in turn connected to a pin 41 on an adjustable eccentric 42 on the shaft 43 of the motor 44 which is supported on the platform 26. Therefore, as the eccentric causes the bar 40 to move up and down, the clutch member, which presses against the outer surface of the rod 20, causes it also to reciprocate and the setting of the bushing 30 which contacts one portion of the clutch will vary the point at which the clutch is released. The stroke of the rod may be adjusted by adjusting the eccentric member 42 to cause larger or smaller gaps between the upper copper electrode 22 and the lower lead electrode. The slip action of the clutch, when it is released by the bushing 30, allows the copper electrode to be fed down as the lead electrode is decomposed so that the stroke or distance between the two at the upper end of the stroke is always the same, even though the level of the lead may change and sink down in the ceramic tube 2.

Also located on the shaft 43 is a pulley 46 which drives a speed counter 48 through a belt 49 so that the number of arcs drawn may be tabulated.

Connected to the steel rod above the copper electrode at point 50 is a cable 52, the other end of which is also connected to the switch 18 in proximity to the cable 4. From the opposite pole of the switch member, to which the cable 52 is attached, is a cable 54 connected to one side of a generator 56. The opposite pole of the switch member is connected by a cable 58 to a series of reactance units 60 which may be varied as the conditions require. The other side of the reactance units is connected by a cable 62 to the opposite pole of the generator 56. The generator is driven by a motor 64, which is run from any suitable A. C. supply 66. It should also be noted that the lead is preferably connected to the negative side of the generator and the copper to the positive. The apparatus will work satisfactorily with the opposite polarity, but making the copper electrode positive gives better efficiency. The D. C. motor 44, which supplies the vertical reciprocation to the rod 20, is supplied from any suitable D. C. supply 68 having a suitable switch 70 and a rheostat 72 in its circuit to give any desired speed changes for the process.

The salient features therefore of this apparatus are as follows:

1. The utilization of a long, ceramic tube within which a quantity of lead is cast which is desired to reduce to small particles. This tube is placed in a vertical position and immersed in water. In this way the small particles which are disintegrated by the arc, and are not as yet of sufficiently small dimensions, cannot be discharged laterally but remain in the proximity of the electrode and must be forced out over the tube and therefore do not leave until they are of sufficiently small size. The use of the water is to cool and condense the dispersed metal vapors formed by the heat of the arc, and also to serve as a medium in which the metal may remain until its final disposition in some process or product.

2. The use of a vertically reciprocated upper electrode whose stroke may be maintained constant and which is automatically fed down as the lower electrode disintegrates.

3. The use of a D. C. motor to drive the aforesaid rod in order to obtain a sufficient variation in speed.

4. The use of a certain amount of reactance in the generator circuit supplying the electrodes for the arc to vary the characteristics of this circuit to give a more satisfactory result.

5. The use of the proper conditioning of the lead electrodes by control of precasting conditions and pouring temperature, cooling rates, heat treatment following casting, and by the addition of small amounts of the proper alloying ingredients to the metal being dispersed so as to provide the most stable suspension and the greatest disintegration rate per unit of electrical energy consumed.

With the above apparatus in mind the process therefor will be described as follows:

The ceramic tube 2 with its casing 14 is placed in an upright position in the vessel 8 and the spreader 16 clamped on the upper end to prevent it from over-turning. The vertical rod 20 is then placed in position with the electrode 22 within the upper portion of the ceramic tube and contacting the upper surface of the cast metal. The D. C. motor 44 is started by closing switch 70 and the speed regulated to the desired point by the rheostat 72. The bushing 30 is then turned to a position to which the clutch member 34 makes slight contact therewith so that the clutch will be released to allow the upper electrode to feed downwardly. The bushing 30 is then set in place by set screw 32. The length of the stroke of the rod 20 is adjustable on the eccentric member 42 and of course this is set before the motor is started. After the motor 44 has been placed in operation and all the apparatus adjusted, the switch 18 is closed which connects the negative side of the generator 56 to the lower or lead electrode and the positive side thereof to the copper electrode. Then as the copper electrode tends to move from the lead, an arc will be drawn which will disintegrate the upper surface of the lead electrode and reduce the metal. It should be mentioned that the wear on the copper electrode is negligible. The particles of lead are kept near the arc by the tube until they are of sufficiently small size. These small particles gradually flow out of the upper portion of the ceramic tube 2 and remain in suspension in the liquid (distilled water). When the operation has progressed for a sufficient length of time, the motors are shut down and the suspension is poured into another container for further utilization.

There are many variables in the system, for example: the voltage of the generator, the current, the current density at the electrode contacts, the contacts per minute between the two electrodes, the length of the stroke of the movable electrode, which influences the length of the arc, the nature of the contact between the two electrodes, the elapsed time of the run resulting in greater or lesser concentration of the suspension, size, mass, material and preparation of the opposing electrodes, the temperature of the water and the amount of reactance placed in the circuit.

By suitably varying any one or all of these elements, we may obtain different desired results depending upon the particular set-up. It has been found essential, for example, to have incorporated a certain amount of reactance in the circuit, and to change the amount of this reactance to suit various combinations of other factors. Thus, in the following tabulation, it will be seen that more reactance is required when the dispersable electrode is made of lead plus ½% of bismuth which gives an optimum of 7.4 ohms than when it is made of lead plus 1% of tin which has a 2.4 ohm optimum. The table serves also to give an indication of the amount of reactance necessary when working with dispersible electrodes of 3" diameter, current of 140 to 150 amperes, and 600 contacts per minute over the period of one hour. It shows, moreover, in the case of lead plus bismuth, how the yield may be increased by lengthening the stroke, up to the point where increased power requirements out of proportion with the higher yields, or other deleterious effects, make further increase inadvisable. The costs given in this table are based upon the arbitrary figure of one cent per kilowatt-hour for electrical energy, 60 cycle A. C. It is evident that these costs include any losses in conversion to direct current. In these runs all the factors were maintained substantially constant with the exception of the stroke and inductive reactance:

explained in the specification. Connected to the upper rim of the cylinder 84 at 88 is one end of a power cable 90, the opposite end being connected to the double pole switch 92 which is connected to the D. C. power supply 94. Supported above the two concentric cylinders 82 and 84 is a copper electrode 96 on a long steel shaft 98 in a manner similar to that shown in the foregoing specification, the upper end of the rod being supported in a vertical sleeve 100 and the center portion of the rod extending through a hollow bushing 102 threaded into a supporting bearing 104. Connected to the shaft 98 by any suitable bolt clamping means 106 is a cable 108, the opposite end of which is connected to one terminal of a solenoid coil 110, the opposite side of the solenoid coil being connected by wire 112 to the other side of the double pole switch 92 and thus to the D. C. power supply.

Pivotally connected at 116 to a vertical portion of the frame work 80 is a horizontal arm 114, one end of which is connected to a vertical link 118, the lower end of which is connected to a clutch mechanism 120 which is identical with the clutch members 34, 36 and 38, shown in the first modification of this invention. The opposite end of the arm 114 is pivotally connected to a vertical rod 122 which extends downwardly through the solenoid 110 and has rigidly clamped to the lower extremity thereof an adjustable stop 124.

The operation of this modification is as follows:

The copper or movable electrode is spaced above the lower lead electrode 86 and out of contact with the same and the switch 92 is then

| Length of stroke, inches | Inductive reactance | | | | | |
|---|---|---|---|---|---|---|
| | 0 ohms mat'l—cost/lb. | 1.2 ohms mat'l—cost/lb. | 2.4 ohms mat'l—cost/lb. | 4.9 ohms mat'l—cost/lb. | 7.4 ohms mat'l—cost/lb. | 10.0 ohms mat'l—cost/lb. |
| For Lead Plus ½% bismuth | | | | | | |
| ⅛ | | | 520 gms.-6.5¢ | 525 gms.-5.4¢ | 525 gms.-6.0¢ | 510 gms.-6.0¢ |
| ¼ | | | 710 gms.-5.15¢ | 840 gms.-4.4¢ | 940 gms.-3.9¢ | 950 gms.-4.2¢ |
| ⅜ | | | | 900 gms.-4.0¢ | 1180 gms.-3.5¢ | 970 gms.-3.8¢ |
| For lead plus 1% tin | | | | | | |
| ⅛ | 127 gms.-14.6¢ | 202 gms.-8.8¢ | 709 gms.-3.8¢ | | 611 gms.-4.4¢ | 710 gms.-4.75¢ |

This definitely shows that as the stroke is increased, all other factors remaining constant, that the amount of reactance necessary to give the most satisfactory results increases and that for different combinations or alloys that the optimum reactance will vary.

The temperature of the water medium surrounding the electrodes becomes quite high and therefore the runs should not be too long either from this point of view or from the point of view that the suspension becomes too concentrated after a certain length of time run.

In Figure 4 is illustrated a modified form of apparatus for accomplishing the same result. In this form any type of suitable frame work 80 is supplied upon one portion of which a vertical cylinder 82 is positioned which may be filled with water up to the level shown in the drawings. Within the cylinder 82 is placed a second smaller cylinder 84 which may be made of any electrical conducting medium such as steel. Cast in the lower portion of the cylinder 84 is a block of lead 86 which may include small amounts of tin, bismuth or other similar material as formerly closed. Since the circuit is broken between the two electrodes, the solenoid 110 will exert no effect upon the vertical rod 122 and therefore will allow the rod 98 to be pulled down by gravity until the contacts 86 and 96 meet which will complete the electrical circuit through the solenoid and the two contacts. This will cause a comparatively large current to flow through the solenoid 110 which will pull down upon the rod 122 and through the various links and levers cause an upward pull upon the copper electrode 96 pulling it away from the lead electrode 86 and causing an arc therebetween. This action will continue until the arc has been drawn out to such an extent that it will collapse thereby breaking the circuit through the solenoid which will again allow the copper electrode to descend under gravitational action until contact was again made. This operation will continue indefinitely and of course, due to the arc, the lower contact will disintegrate giving a suspension as set forth in former parts of the specification. The clutch operation will be identical with that set forth in the former species of the invention so that it is not thought necessary to further describe that action as to how the copper electrode will automatically feed downwardly as the lead electrode is disintegrated and eaten away. The stop 124, on the lower end of the rod 122, may be adjusted to a position to give proper operation and not allow the copper electrode to be moved through to too great a distance. It is thus evident that in this type it is necessary to start the operation by hand in raising the copper electrode before the switch is closed and then allowing it to descend to make the first contact.

To point out the utilization of the solution obtained, a certain quantity of asbestos fibers are placed in a vessel and this liquid, with the metal suspension, is poured into the vessel. The lead particles coat the outer surface of each of the fibers of the asbestos material and the water is gradually drained off. This coating is probably due to several actions, first, each one of these small particles of lead carries a positive electrical charge as has been demonstrated by electro-phoretical experiments. In this respect the lead suspension is analogous to true colloidal particles. It is generally true that asbestos carries a negative charge respective to water (See Bancroft, "Applied Colloid Chemistry" page 259, lines 3 to 7) and therefore the lead particles possibly are attracted thereto. There is also the filtering action of a substance like asbestos which moves through a medium in a consolidated mass, tending to sweep it clean of suspended material. However, the two above mentioned influences are not thorough in their action and we prefer to supplement them by the introduction of a coagulant such as carbon dioxide ($CO_2$). The action of this coagulant is to provide negative ions which will discharge the positive electrical charge carried by the dispersed lead particles. The resultant mass is freed of excess water, preformed to shape, molded under high pressure, and suitable temperature, and this converted into a friction material such as brake lining.

We claim:

1. In apparatus for making finely divided metal, a container filled with liquid, a hollow vessel immersed therein, a quantity of metal partially filling the vessel, a reciprocable electrode supported within the hollow portion of the vessel, means for applying a potential difference between the metal and the electrode whereby an arc may be drawn between them and means for reciprocating the electrode.

2. In apparatus for making finely divided metal, a vessel filled with liquid, a hollow ceramic tube immersed therein, a quantity of metal partially filling the tube, a vertically reciprocable electrode suspended within the hollow portion of the tube, means for applying a potential difference to the metal and the electrode whereby an arc may be drawn between them and means for reciprocating the electrode.

3. In apparatus for making finely divided metal, a block of metal to be disintegrated, means supporting the block being filled with liquid so that the block is immersed, means adjacent the block and relatively reciprocable thereto, an electric supply circuit applied to the block and the second named means whereby an arc may be generated between them, and a member immersed in the liquid enclosing the block, second named means, and the arc.

4. In an apparatus for making finely divided metal, a block of metal, means supporting the block filled with liquid so that the block is immersed, means adjacent the block and relatively reciprocable thereto, an electrical supply circuit applied to the block and second named means whereby an arc may be generated between them and a heat resisting member enclosing the block, second named means and the arc.

5. In an apparatus for making finely divided metal, a block of metal, means supporting the block filled with liquid so that the block is immersed, means adjacent the block and relatively reciprocable thereto, an electrical supply circuit applied to the block and second named means whereby an arc may be generated between them and a heat resisting member enclosing the block, second named means and the arc and reactance units in the supply circuit to smooth out the arc.

6. In apparatus for making a suspension of metal particles, a block of metal to be reduced, means supporting the same, an electrode supported above the block, a source of current connected to the block and electrode, means for reciprocating the electrode to form an arc and automatic clutch means for feeding the electrode down as the lower block disintegrates to keep the arc always of the same length.

7. In an apparatus for making finely divided metal, a movable electrode, adjustable means operating through a fixed distance for reciprocating the electrode and operating means including a clutch contacting the electrode and a trip whereby the electrode will automatically reciprocate through the same distance at different levels to allow for the disintegration of adjacent material.

8. In apparatus for making finely divided metal, a metal block to be disintegrated, a container filled with liquid within which the block is supported, an electrode of dissimilar metal, a rod supporting the electrode, a grip and release clutch means for reciprocating the rod and the electrode, adjustable means which contacts the clutch to cause its release at a given point and electrical means for reciprocating the clutch means to cause reciprocation of the rod and electrode.

9. In apparatus for making finely divided metal, a hollow tube, a metal block therein partially filling the tube, a container for water within which the tube and block are supported, a dissimilar electrode supported within the hollow end of the tube, means for reciprocating the electrode including a grip and release clutch to allow the electrode to feed toward the metal surface as the latter disintegrates and an electric circuit connected to the metal and the electrode to cause an arc therebetween upon relative reciprocation to cause the disintegration.

DALE M. PHILLIPPI.
JAMES E. WILSON.